C. W. BREWER.
STARTING DEVICE FOR AUTOMOBILES.
APPLICATION FILED MAY 29, 1912.

1,130,059.

Patented Mar. 2, 1915.

3 SHEETS—SHEET 1.

WITNESSES
M. R. McInnis
H. A. Bowman

INVENTOR
CARLOS W. BREWER
BY
ATTORNEY

C. W. BREWER.
STARTING DEVICE FOR AUTOMOBILES.
APPLICATION FILED MAY 29, 1912.

1,130,059.

Patented Mar. 2, 1915.

3 SHEETS—SHEET 2.

WITNESSES
M. R. McInnis
H. A. Bowman.

INVENTOR
CARLOS W. BREWER
BY
ATTORNEY

C. W. BREWER.
STARTING DEVICE FOR AUTOMOBILES.
APPLICATION FILED MAY 29, 1912.

1,130,059.

Patented Mar. 2, 1915.
3 SHEETS—SHEET 3.

WITNESSES
M. R. McInnis
H. A. Bowman

INVENTOR
CARLOS W. BREWER
BY
ATTORNEY

UNITED STATES PATENT OFFICE.

CARLOS W. BREWER, OF MINNEAPOLIS, MINNESOTA.

STARTING DEVICE FOR AUTOMOBILES.

1,130,059.   Specification of Letters Patent.   Patented Mar. 2, 1915.

Application filed May 29, 1912.   Serial No. 700,491.

*To all whom it may concern:*

Be it known that I, CARLOS W. BREWER, a citizen of the United States, residing at Minneapolis, in the county of Hennepin and State of Minnesota, have invented certain new and useful Improvements in Starting Devices for Automobiles, of which the following is a specification.

My invention relates to starting devices for automobiles and has for its object to provide a power device in which the power is taken from a driven shaft of the automobile and stored in a series of interconnected springs, said springs having connection through one of their members with a spring adapted to be clutched in driving relation to the crank shaft of the automobile to turn the same over and start the engine.

It is an object of my invention to provide a device which upon actuation by the operator will turn the engine shaft two full revolutions and then will be automatically disconnected.

It is also an object of my invention to provide means to store up sufficient energy in the spring system to actuate the starting mechanism to make the aforesaid double revolutions a number of times—say, ten to fifteen times.

It is a further object of my invention to provide means for winding up the spring which shall be absolutely automatic in operation requiring no clutching devices or intervention on the part of the operator to effect the winding operation while the engine is running. To this end the winding mechanism is related to the spring system so that it automatically gears with the shaft when the tension on the spring is less than a determined amount, conversely becoming disconnected when the tension passes above such determined point.

The full objects and advantages of my invention will appear in connection with the detailed description thereof and are particularly pointed out in the claims.

Figure 1:
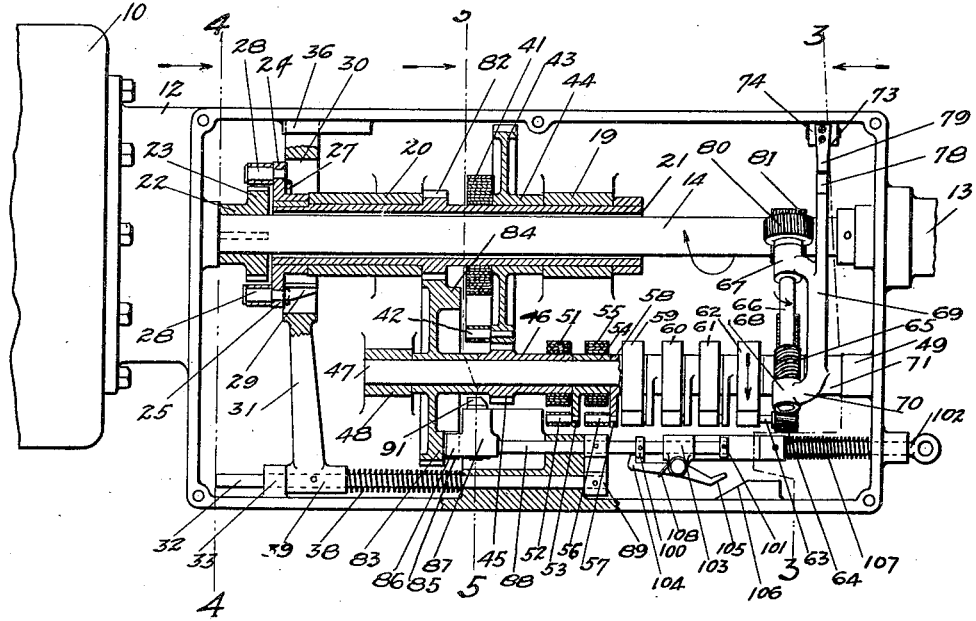
Figure 2:
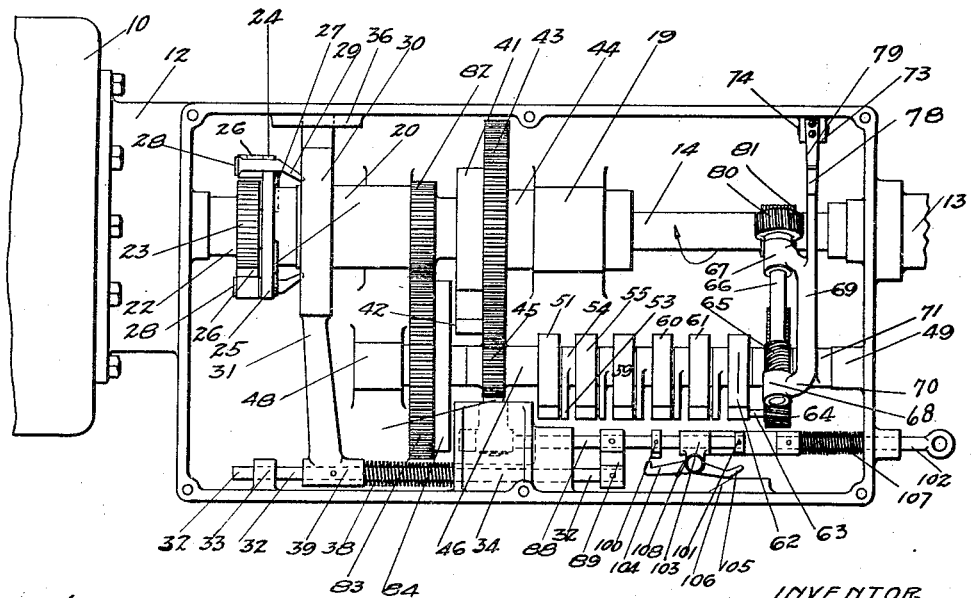
Figure 3:
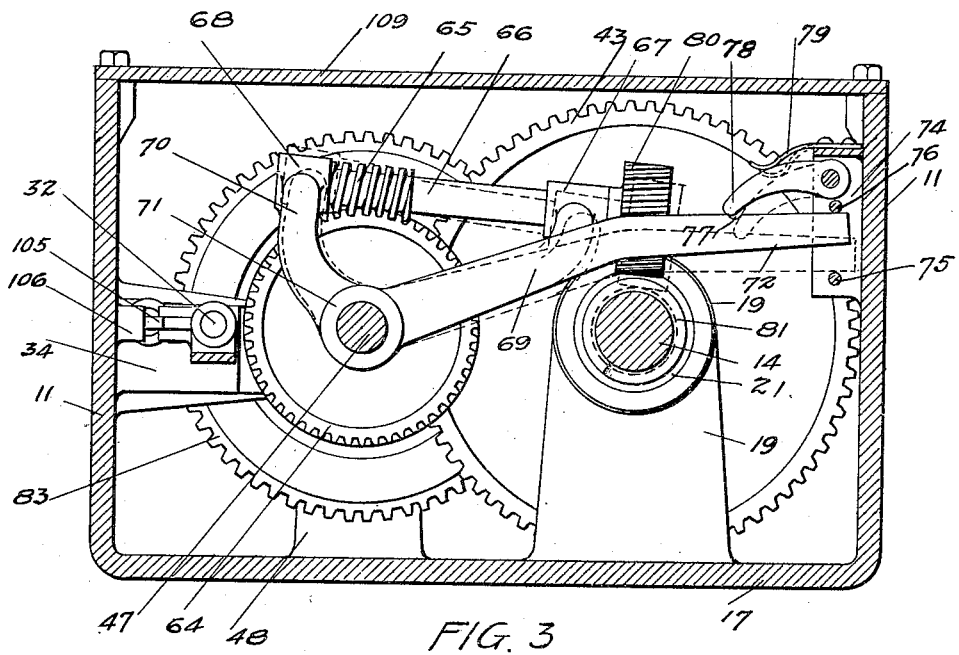
Figure 6:
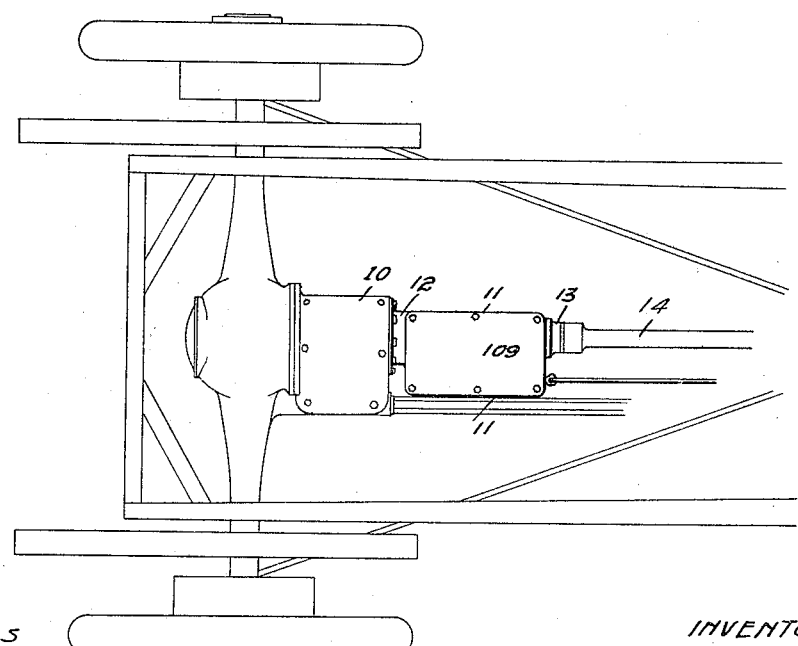
Figure 4:
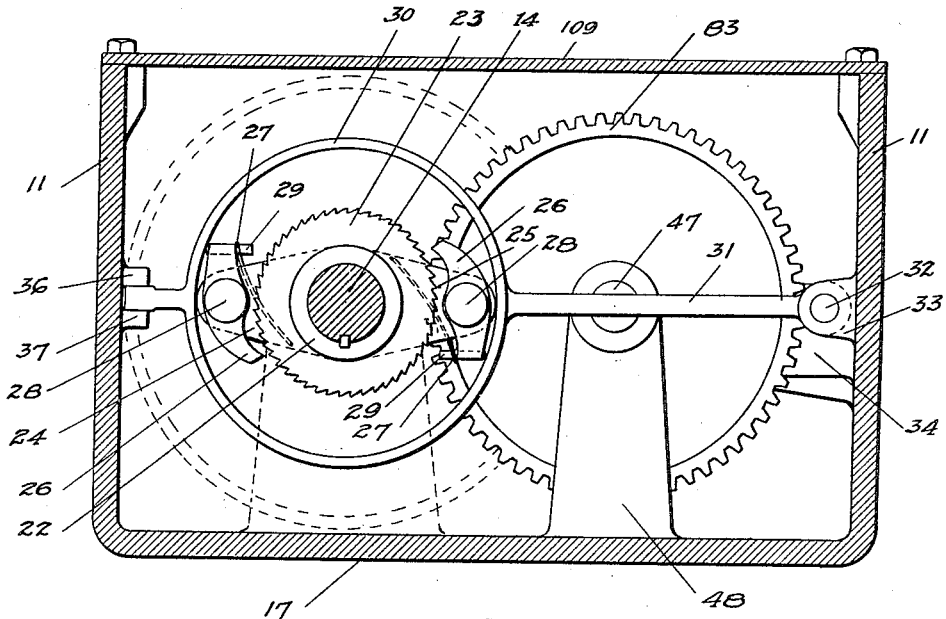
Figure 5:
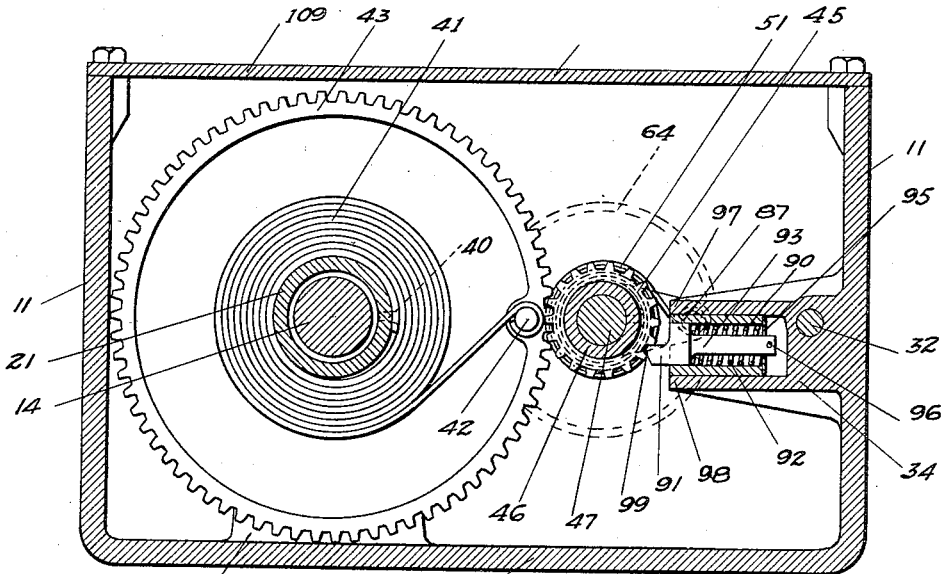

In the drawings, illustrating the application of my invention in one form,—Figure 1 is a plan view of the starter with certain parts in section. Fig. 2 is a plan view showing the parts in a different position. Fig. 3 is a sectional view on line 3—3 of Fig. 1. Fig. 4 is a sectional view on line 4—4 of Fig. 1. Fig. 5 is a sectional view on line 5—5 of Fig. 2. Fig. 6 is a plan view of a portion of the frame and running gear of an automobile showing my improvements applied thereto.

Secured to the end of the gear casing 10 when said gear casing is placed adjacent the rear axle of the automobile in a well known manner, as shown in Fig. 6, and taking the place of the usual torque tube is a casing having at one end a tubular boxing 12 by means of which the casing is bolted to the gear case and for support at the other end a boxing 13, the drive shaft 14 passing through extensions 12 and 13 to the fly-wheel and clutch mechanism through which power is transmitted from a motor, in the usual way. The casing 11 is provided with a closed bottom 17 upon which are bolted a pair of standards 19 and 20 forming interior bearings for a long sleeve 21 which surrounds but does not engage the shaft 14, as clearly shown in Figs. 1 and 5. Keyed to the shaft 14 adjacent the end of sleeve 21 is a sprocket hub 22 having thereon a toothed sprocket wheel 23. Secured to the sleeve are oppositely disposed arms 24 and 25 each carrying a pawl 26 spring-actuated by a hub spring 27 to cause the pawl normally to move into engagement with the ratchet wheel 23. The pawls 26 are pivotally mounted on pins 28 and are provided on the ends away from the pawl proper with wing arms 29 which are adapted to be engaged by a ring 30 carried by an arm 31 rigidly secured on a rod 32 slidably mounted in bearings 33 and 34 formed on a wall of casing 11. The ring 30 has extended therefrom away from arm 31 a lug 35 engaging within a slot formed between two projections 36 and 37 extending outwardly from the opposite wall of casing 11. A spring 38 extending in surrounding relation to rod 32 between bearing 34 and the hub 39 of arm 31 normally operates to force the ring 30 in a direction to engage the wings 29 and hold the pawls 26 out of engagement with the teeth of ratchet wheel 23. When the rod 32 is moved by means hereinafter described against the force of spring 38 the ring 30 is thereby withdrawn from engagement with wings 29 which permits springs 27 to throw the pawls 26 into engagement with the teeth of ratchet wheel 23 thereby clutching the sleeve 21 to the shaft 14.

Secured at one end, as indicated at 40, to the sleeve 21 is a spiral spring 41 the opposite or outer end of which is secured to a pin 42 on a spur gear 43, the hub 44 of which is loosely mounted on the sleeve 21. The spur gear 43 meshes with a pinion 45 on a sleeve 46 loosely mounted on a shaft 47 non-rotatably secured at one end in a post or bracket 48 extending upwardly from the bottom 17 of the casing 11 and secured at the other end to a bracket or socket 49 extending inwardly from an end wall of the casing 11. The sleeve 46 has attached thereto, as indicated at 50, one end of a spiral spring 51, the other end of said spring being secured to a pin 52 extending outwardly from an arm 53 on a sleeve 54 loosely mounted on shaft 47. The sleeve 54 in turn has secured thereto the end of a spring 55 the other end of which is secured to a pin 56 on an arm 57 of a sleeve 58 similar to sleeve 54. A series of springs 59, 60, 61 and 62 are each similarly mounted, the inner end being attached to a sleeve about which the spring is coiled and the outer end to a pin extending away from an arm on an adjacent sleeve, the outer end of the last spring 62 being secured to a pin 63 extending from a worm gear 64 loosely mounted upon the shaft 47. The worm gear 64 meshes with a worm 65 on a shaft 66 journaled in bearings 67 and 68 formed on arms 69 and 70 extended from a hub 71 loosely mounted on shaft 47. Extending from the arm 69 is a finger 72 entering between a pair of lugs 73 and 74 and limited in movement between said lugs by two pins 75 and 76 extending across the space between the lugs on each side of finger 72. The finger 72 is provided with a shallow notch or depression 77 in which is adapted to seat the round end of a dog 78 pivoted between lugs 73 and 74 and actuated by a spring 79 to press the dog 78 downward into engagement with the depression 77. The shaft 66 outside of bearing 67 is provided with a worm gear 80 which is held in mesh with a worm 81 fast on shaft 14 when finger 72 is held in its lowered position by dog 78 engaging in depression 77.

The ratio of the gears 80 and 81 and 64 and 65, respectively, may be such as to produce any desired relative rotation of gear 64 in relation to the rotation of shaft 14, a desirable ratio of gearing being that which would produce about one turn of gear 64 for every one hundred turns of shaft 14. The operation of the said gears in relation to the springs 51, 55, 59—62 will readily be apparent. When the motor is running and the drive shaft 14 turning the aforesaid springs will be wound up storing energy therein and through rotation of pinion 45 on sleeve 46 will rotate spur gear 43 and wind up the spring 41 connected with sleeve 21. The relative sizes of gears 45 and 43 may be about one to four, so that energy taken from the series of springs 51—62 will store energy in spring 41 at four times the initial expansive force or pressure of such pressure actually exerted by the series of springs upon pinion 45. When the energy stored up in all of the aforesaid springs reaches a determined point the turning force exerted upon gear 64 and through arm 69 and finger 72 will overcome the force of spring 79 holding finger 78 in depression 77 and will cause the said finger to leave the notch 77 and the finger 72 suddenly to fly up into engagement with pin 76 thereby instantly withdrawing gear 80 out of mesh with worm 81. It will thus be seen that energy is taken from the drive shaft 14 at an almost inappreciable rate and stored up in spring 41 and the series of springs 51—62, the clutching and unclutching of the spring winding mechanism being absolutely automatic and determined solely by a fixed maximum pressure exerted by said springs which fixed maximum will be less than the maximum capacity of the springs.

By the releasing means later described it is designed that the spring 41 shall operate to turn sleeve 21 and through connection therewith to shaft 14 to turn the said shaft and effect the starting of the engine, means being provided which normally permits the spring 41 to turn the shaft 14 two complete revolutions each time that the same is tripped. The spring 41 will always be wound up tight by reason of the reduction in gearing between pinion 45 and gear 43 so that the initial pressure for starting action will always be the same whether springs 51—62 are fully energized or not. It is contemplated that a sufficient number of the springs 51—62 will be employed to permit charging of spring 41 and double turning action thereof on shaft 14 to take place from eight to fifteen times without recharging the springs 51—62. This will provide for the contingency of a cold motor which sometimes makes it necessary for the shaft to be turned a considerable number of times before ignition and starting can take place.

Upon the sleeve 21 is a pinion 82 meshing with a gear 83 loose on shaft 47. The gear 83 is twice the circumference of pinion 82 so that two rotations of pinion 82 will effect one complete revolution of gear 83. Upon the side of gear 83 is formed an annular flange or rim 84 provided with a break or notch 85 within which is adapted to seat a latch 86 on a piece 87 carried by a rod 88 slidably mounted in the bracket 34 in which the rod 32 has a bearing. The rods 88 and 32 are rigidly secured together by means of a link 89. The piece 87 is formed with a transverse aperture 90, as most clearly shown in Fig. 5, within which slides a latch member 91. A spring 92 within the cavity 90 surrounds the shank 93 of the latch member 91 and operates between a shoulder 94 on said latch member and the bottom wall 95 of the cavity normally to force the latch 91 into its outward position in which a pin 96 on shank 92 is caused to engage the bottom wall 95. When through the rod 88 the piece 87 is moved in the bearing formed therefor between wings 97 and 98 on the bracket 34 the catches 86 and 91 will be simultaneously moved, catch 86 leaving notch 85 and releasing sleeve 21 so that spring 41 can rotate the same while catch 91 will enter between the teeth on pinion 45, as best shown in Fig. 5, locking said pinion and the spur gear 43 from rotation by springs 51—62 so that the spring 41 alone acts to turn sleeve 21. The catch 91 is beveled, as indicated at 99, so that it will operate to hold spur gear 46 from rotation in one direction. But should the engine back fire so as to turn sleeve 21 in reverse direction the beveled portion 99 would permit pinion 45 to rotate, the energy of the back stroke being absorbed in the springs 51—62. The rod 88 has fast thereon a pair of collars 100 and 101. A rod 102 extends through an end wall of casing 11 and has a sleeve 103 offset therefrom and loosely embracing rod 88 between collars 100 and 101. Pivoted to sleeve 103 is a hook-like dog 104 adapted to normally engage over collar 100. The dog 104 has a cam-headed arm 105 which engages a cam 106 on a side wall of casing 11 thereby operating to lift the pawl from engagement with collar 100, as clearly shown in Fig. 2. The arm 102 is normally held in its inward position by means of a spiral spring 107 and the dog 104 has a cam head which will cause the same to ride over collar 100 and be hooked in position by the operation of a spring 108 in a well known manner.

When the rod 102 is operated by suitable connections to a hand or foot lever it will, through the dog 100, slide rod 88 and with it rod 32 and ring 30 simultaneously releasing the dogs 26 to permit the same to clutch sleeve 21 to shaft 14, releasing gear 83 and therefore sleeve 21 by withdrawing catch 87 from notch 86 and locking pinion 45 and gear 43 by placing catch 91 between a pair of teeth on pinion 45. The spring 41 will instantly start to rotate sleeve 21 and with it gear 83. The cam arm 105 will at that moment engage cam 106 swinging dog 104 into the position shown in Fig. 2 out of engagement with collar 100. The catch 86 will ride upon flange 84 holding parts in the position shown in Fig. 2 until notch 85 has been carried around a complete revolution when spring 38 will retract the parts, catch 86 entering notch 85 and locking gear 83 and sleeve 21 from further rotation, while ring 30 will engage wings 29 and pawls 26 thereby swinging said pawls out of engagement with ratchet wheel 23 and thus disconnecting sleeve 21 from shaft 14. At the same time catch 91 will be withdrawn from pinion 45 and the springs 51—62 will, through pinion 45 and spur gear 43, re-wind spring 41 to its maximum capacity. The sleeve 21 and with it the shaft 14 will have been turned two complete revolutions which, under all ordinary conditions, will have resulted in starting the explosive engine. If, however, the engine should fail to fire the spring 41 will have again become completely wound and the operation may be repeated, there being enough energy stored up in springs 51—62 to repeat the double turning movement from eight to fifteen times according to the number and size of the set of springs 51—62. In some cases it may be desirable to render available the power of all of the springs to operate continuously upon sleeve 21 and shaft 14 to turn the same as long as there is sufficient power in said springs. To effect this, rod 102 may be drawn still farther out so that sleeve 103 engages collar 101 in which case piece 87 may be drawn sufficiently to the right to carry catch 91 through and past pinion 45. This will hold the parts positively from returning when notch 85 has completed a revolution and will permit all of the springs to act continuously to turn shaft 14 until the power in said springs is completely exhausted.

The casing 11 may be provided with a cover 109 bolted to the top thereof so that all the parts within said casing will be sealed from dust and exposure.

It will be apparent that my device can be applied to automobile structures with great facility, occupying space which in structures as at present devised is unoccupied. The operation of the means for storing energy in the springs is absolutely automatic and the controlling mechanism for the starting device is certain and positive in its action. Of course, before using this starting device it will be necessary that the transmission shall be operated so as to place the gears in neutral position just as would be true in any starting device.

The many advantages of my improved and novel starting mechanism will be apparent. In the first place but a single motion by the operator, effected by one lever, is necessary in operating the starter, the actuating spring being tripped and the sleeve being clutched to the drive shaft simultaneously upon such movement. The multiplicity of operation required of gas starters and other mechanical starters is thus avoided. The mechanism of the starter is all entirely out of contact with the moving parts of the engine except during the brief period when the starting or shaft-turning operation is being effected, the ratchet wheel and the worm on the drive shaft rotating freely therewith without any frictional engagement with any non-operating parts. The worm, of course, engages the worm wheel for accumulating the power in the sets of springs until the maximum predetermined amount of said power has been stored up, when disconnection complete and instantaneous automatically takes place. The springs are all of them always wound up and unwound in the same direction. All of the power accumulating and power delivering mechanisms, therefore, have continuously rotating movements. There is nothing about the mechanism that the operator will need to watch. The entire mechanism may be inclosed in a dust proof casing and run in a bath of oil the same as the gearing. This casing is positioned where it does not interfere with any of the running parts of the automobile, is invisible and conveniently positioned. It is primarily meant to be built into the car, but in effecting this practically no changes are required in the well known automobile constructions, and in fact the starter mechanism can be applied to automobiles already constructed. Finally, my starter comprises an initial power-applying member always operative at its maximum capacity in combination with power-accumulating means capable of recharging said initial power-applying member to effect a series of successive starting or shaft-rotating operations, so that failure of the first or succeeding attempts may be supplemented by further operations until successful starting is effected.

I claim:

1. In combination with the crank-shaft of an explosive engine, a starter comprising means for accumulating energy, a shaft having operative connection with said crank-shaft, means for rotating said shaft to start the engine including a mechanical energizing device adapted to be charged up to its maximum capacity from said accumulating means, and means under the control of the operator for releasing said device to permit the same to act upon and turn the shaft.

2. In combination with the crank-shaft of an explosive engine, a starter comprising means for accumulating energy, a shaft having operative connection with said crank-shaft, means for rotating said shaft to start the engine including a mechanical energizing device adapted to be charged up to its maximum capacity from said accumulating means, and means under the control of the operator for simultaneously releasing the said device to permit the same to act upon and turn the shaft and for locking said accumulating means from action on the said device.

3. In combination with the drive shaft of an automobile, means for rotating the shaft to start the engine including a spring, means connected with said spring for winding up the same including a shaft mounted to oscillate about the same axial center as the winding means and adapted to have driving connection with the drive shaft, said winding means being operated automatically by the spring when the tension thereof reaches a predetermined degree to cause the second named shaft to be disconnected from the drive shaft, a finger having connection with the second named shaft, and a pressure device engaging said finger whereby the second named shaft is rocked into operative engagement with the drive shaft when the pressure of the spring effective to oscillate said second named shaft becomes less than that of said pressure device.

4. In combination with the drive shaft of an automobile, means for rotating the shaft to start the engine including a spring, means connected with said spring for winding up the same including a shaft mounted to oscillate about the same axial center as the winding means and adapted to have driving connection with the drive shaft, a finger having connection with said second named shaft, and a dog spring-actuated to engage said finger and cause the same to rock the shaft into operative engagement with the drive shaft when the pressure of the spring effective to oscillate said second named shaft falls below a predetermined degree.

5. In combination with the drive shaft of an automobile, means for rotating the shaft to start the engine including a spring, means connected with said spring for winding up the same including a shaft mounted to oscillate about the same axial center as the winding means and adapted to have driving connection with the drive shaft, a finger having connection with said last named shaft, said finger being provided with a notch, and a dog spring-actuated to engage said finger and having a rounded end to seat in said notch to hold the second named shaft in operative engagement with the drive shaft until the pressure of the spring holding the dog and shaft is overcome by the force of the wound spring.

6. In combination with the drive shaft of an automobile, a power accumulating device comprising a set of independent springs arranged in series, means for taking power from the drive shaft and storing it in said springs, a starter mechanism including a single spring, and means to transmit power from said set of springs to wind up the last named spring after each operation thereof.

7. In combination with the drive shaft of an automobile, a power accumulating device comprising a set of independent springs arranged in series, means for taking power from the drive shaft and storing it in said springs, a starter mechanism including a single spring, and means to transmit power from said set of springs to wind up the last named spring after each operation thereof, said means being such that the power accumulated in the set of springs will all be transmitted to the starter spring to wind the same to maximum pressure for a plurality of operations thereof without recharging the accumulating device.

8. A starter for automobiles comprising a casing, the drive shaft of the automobile extending through said casing, a sleeve supported so as to surround but not engage the drive shaft, power means on the sleeve adapted to rotate the same and the shaft when the sleeve is operatively connected with the shaft, a ratchet wheel on said shaft, dogs carried by the sleeve and spring-actuated to engage the ratchet, wings on said dogs, a ring engaging said wings normally to hold the dogs inoperative, and means under the control of the operator to move the ring to render the dogs operative for connecting the sleeve to the shaft.

9. A starter for automobiles comprising a casing, the drive shaft of the automobile extending through said casing, a sleeve supported so as to surround but not engage the drive shaft, a ratchet wheel on said shaft, dogs carried by the sleeve and spring-actuated to engage the ratchet, wings on said dogs, a ring engaging said wings normally to hold the dog inoperative, a tightly wound spring exerting pressure to turn the sleeve, means locking said sleeve from turning movement, and means for simultaneously moving said ring and said locking means to permit the dogs to engage the ratchet wheel and the spring to rotate the sleeve and thereby turn the shaft.

10. In a starter for automobiles, a spring and connections therefrom to turn the crank shaft of the engine, a fixed shaft, a series of sleeves loosely mounted on said fixed shaft, an arm on each of said sleeves, coil springs each having an end thereof secured to one sleeve and the other end to the arm of an adjacent sleeve, means for winding up the springs on the fixed shaft through one of them, and means for winding up the first named spring to its maximum capacity a succession of times until the power accumulated in the sets of springs is practically exhausted.

11. In a starter for automobiles, a spring and connections therefrom to turn the crank shaft of the engine, a fixed shaft, a series of sleeves loosely mounted on said fixed shaft, an arm on each of said sleeves, coil springs each having an end thereof secured to one sleeve and the other end to the arm of an adjacent sleeve, means for winding up the springs on the fixed shaft through one of them, a pinion on the last sleeve of the series on the fixed shaft, and a gear of larger diameter than the pinion connected with the first named spring for winding up the same.

In testimony whereof I affix my signature in presence of two witnesses.

CARLOS W. BREWER.

Witnesses:
  F. A. WHITELEY,
  H. A. BOWMAN.

Copies of this patent may be obtained for five cents each, by addressing the "Commissioner of Patents, Washington, D. C."